Jan. 23, 1968 R. H. BABYLON 3,365,216
SELF-SEALING COUPLING
Filed Feb. 8, 1966
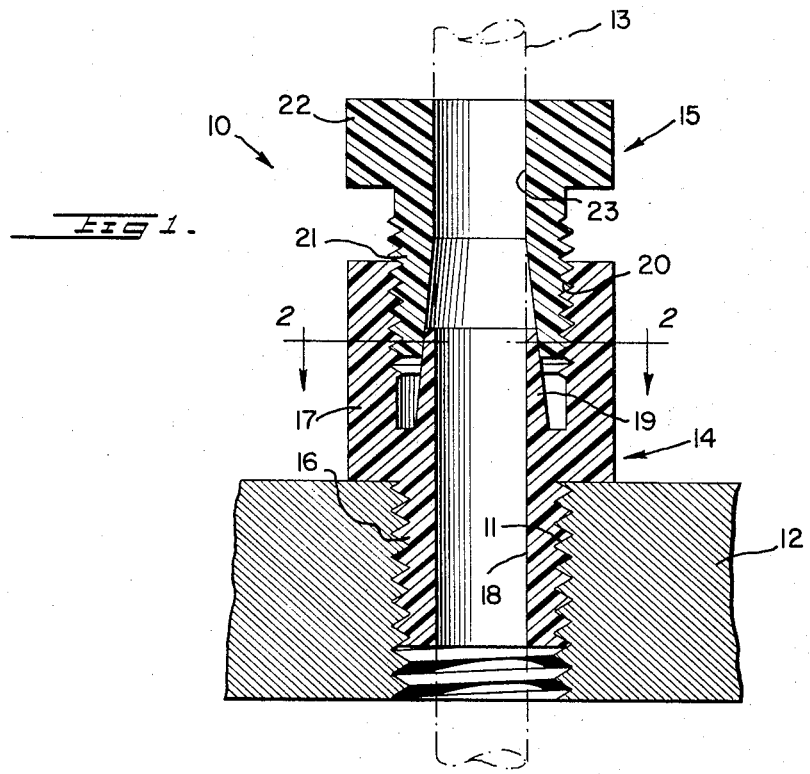
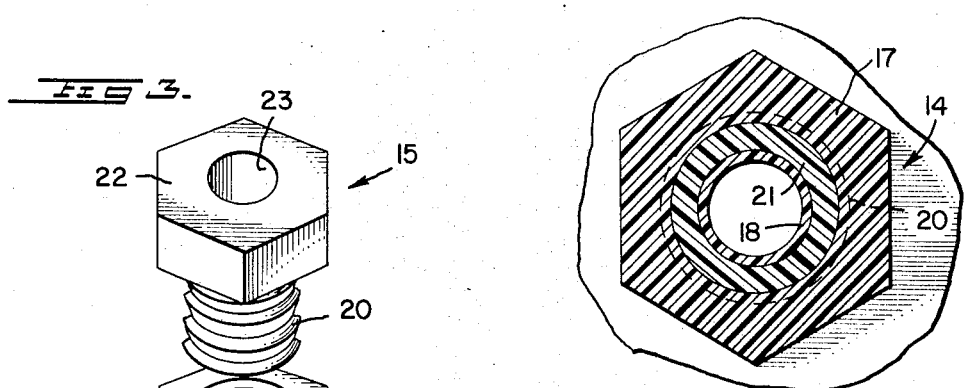
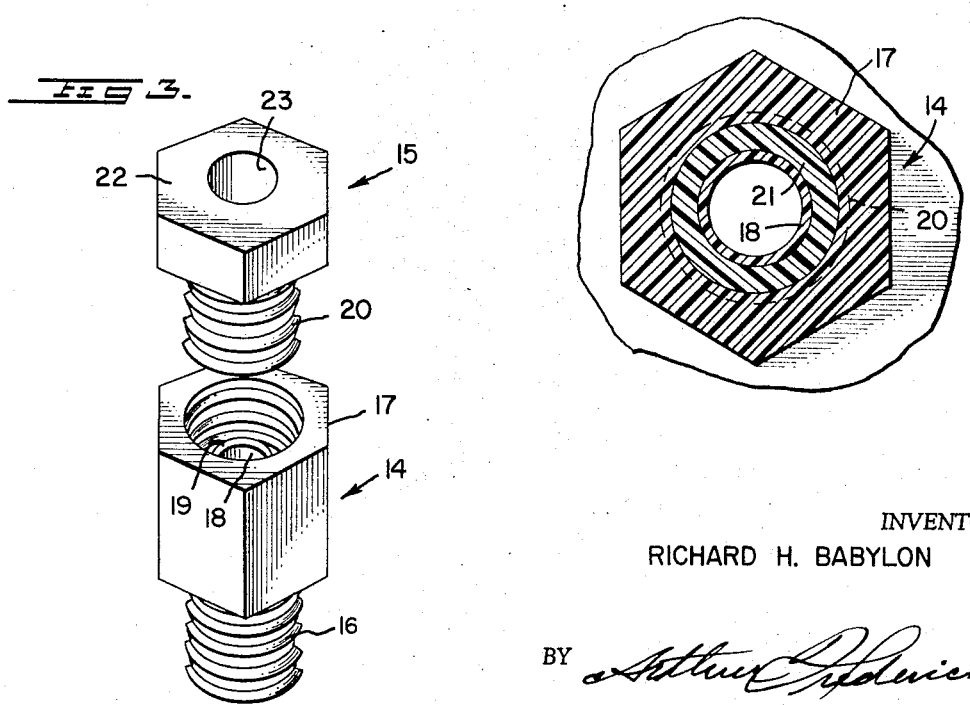
INVENTOR
RICHARD H. BABYLON
BY *Arthur Sydwick*
ATTORNEY

United States Patent Office 3,365,216
Patented Jan. 23, 1968

3,365,216
SELF-SEALING COUPLING
Richard H. Babylon, Hagerstown, Md., assignor to Frick Company, Waynesboro, Pa., a corporation of Pennsylvania
Filed Feb. 8, 1966, Ser. No. 525,934
2 Claims. (Cl. 285—158)

ABSTRACT OF THE DISCLOSURE

The coupling for securing an elongated cylindrical member to another member having a tapped bore in the wall thereof comprises an adapter member threadably secured in the tapped bore and having an axial bore which is counterbored and threaded to receive the threaded shank portion of a cap member. The cap member has an axial bore coextensive with the axial bore in the adapter member. An annular flexible flange is axially disposed in the adapter member in spaced relation to the threaded counterbored section to define an annular groove and having a tapered outer peripheral surface. The axial bore of the cap member is tapered inwardly from the end of the shank portion substantially complementary to the tapered peripheral surface of the flange so that the end of the shank portion fits in said annular groove, and as the cap member is turned into the adapter member, the shank portion of the cap member engages and forces the annular flange radially inwardly against the surface of the cylindrical member projecting through the registered axial bores of the adapter and cap members.

---

This invention relates to couplings and more particularly to a coupling for connecting an elongated cylindrical member, such as a tube or rod, to a tube, conduit or vessel in a fluid tight manner.

Heretofore fittings or couplings of the self-sealing type have comprised a threaded nipple member which is secured in a threaded bore in the wall of a tube, conduit or vessel and an internally threaded nut or cap which is turned upon the distal end of the threaded nipple member. The threaded nipple member and the cap are each provided with an axially extending bore, which bores are in coaxial alignment when the nipple member and the cap are secured together. Within the bore of the cap a resilient, annular, sealing flange is provided which is constructed and arranged to come into abutment with the end of the nipple member when the cap is turned upon the nipple member. As the cap is turned upon the nipple member, the resilient sealing flange is deformed and forced radially inwardly into fluid tight contact with the surface of an elongated cylindrical member disposed within the bores of the cap and nipple member to thereby seal the interstices between cap and the cylindrical member.

The disadvantage of the aforementioned fitting or coupling is that the cylindrical member is axially moved as the cap is turned upon the nipple member sufficiently to effect a secure and fluid tight connection. This axial translatory movement of the cylindrical member makes it exceedingly difficult to secure such member in a precise predetermined position relative to the other tube, conduit or vessel.

Accordingly, it is an object of this invention to provide a coupling having a self-sealing means which coupling is capable of achieving a fluid tight connection without causing axial movement of a cylindrical member to be connected to a tube, conduit or vessel.

It is, therefore, contemplated by the present invention to provide a novel self-sealing fitting or coupling comprising an adapter member and an interconnected cap member. The adapter member has an externally threaded end portion dimensioned to mate with a threaded bore in the wall of an element such as a tube, conduit or vessel. The opposite end of the adapter member has an enlarged cup shaped portion. The adapter member is provided with an axial bore therethrough which is counterbored in the cup portion and threaded to receive the threaded shank of the cap member. The cap member is also provided with an axial bore which is coextensive with the axial bore of the adapter member. Part of the axial bore of the adapter member is defined by a resilient flange disposed in the cup shaped portion. The axial bores in the adapter and cap members are dimensioned to receive therethrough an elongated cylindrical member such as a tube or rod so that when the cap is turned into the cup portion of the adapter member, the end of the shank of the cap member engages the flange and forces the latter into fluid tight contact with the surface of the cylindrical member without exerting a force component parallel to the axis of the cylindrical member.

One application of the fitting or coupling according to the present invention is to secure a cylindrical electrode or other electrical conductor in a precise predetermined position relative to another tube, a conduit or vessel. In such application it is contemplated that the fitting or coupling components be constructed of dielectric material.

The invention will be more fully understood from the following description when considered in connection with the accompanying drawings in which:

FIG. 1 is a sectional view of the assembled coupling according to this invention with the cylindrical member shown in broken lines, FIG. 2 is a cross sectional view taken substantially along line 2—2 of FIG. 1, and FIG. 3 is an exploded view in perspective of the coupling.

Now referring to the drawings, the reference number 10 generally designates the fitting or coupling according to this invention, which coupling is illustrated as secured within a tapped bore 11 in the wall 12 of a tube, conduit or vessel to connect an elongated cylindrical member 13, such as a tube or rod, to the tube, conduit or vessel.

The coupling 10 comprises two interconnected parts, an adapter member 14 and a cap member 15.

Adapter member 14 consists of an externally threaded end portion 16 and an enlarged cup shaped opposite end portion 17. Adapter member 14 is provided with an axial bore 18 which is counterbored at the cup shaped end portion 17 in such a manner as to form an annular, resilient flange 19, the flange partly defining bore 18. As shown, flange 19 may have an outer tapered surface. The counterbored portion of bore 18 is threaded at 20 to receive the threaded shank 21 of cap member 15. The cup portion 17 is provided with peripheral flats (see FIGS. 2 and 3) to facilitate turning adapter member 14 tightly into threaded bore 11.

Cap member 15 consists, in addition to shank 21, of an integral head portion 22. Head portion 22 is provided with peripheral flats (see FIG. 3) adapted to be engaged by a suitable tool, such as a wrench, to facilitate turning cap member 15 within adapter member 14. Cap member 15 has an axial bore therethrough, which is flared at the shank end thereof to form a taper complementary to the taper of flange 19 so that the end of shank 21 fits within the annular groove formed between flange 19 and the threaded counterbored portion of bore 18. The bore 18 and the bore 23 of adapter member 14 and cap member 15, respectively, are coextensive and are dimensioned to receive therein elongated cylindrical member 13.

To secure cylindrical member 13 to the wall 12 of a tube, conduit or vessel by use of coupling 10, adapter 14 is first turned tightly into threaded bore 11. Cap member 15 is then positioned so that the threaded shank 21 engages the threads 20 of counterbored portion of bore 18 and the cap member 15 turned to bring the end of shank 21 adjacent flange 19 of adapter 14. The cylindrical member 13 is then inserted through bores 18 and 23 to a predetermined position relative to the tube, conduit or vessel. Thereafter, cap member 15 is turned to force the end of shank 21 between flange 19 and the counterbored portion of bore 18 and thereby force flange 19 radially inwardly into fluid tight engagement with the outer surface of cylindrical member 13. The cap member 15 is turned sufficiently on threads 20 to securely hold cylindrical member 13 and provide a fluid tight seal in the interstices between the cylindrical member 13 and bores 18 and 23. Since the sealing flange 19 is disposed in the fixed adapted member 14, the turning of cap member 15 to hold cylindrical member 13 and effect a fluid tight seal does not cause axial movement of the cylindrical member 13.

Adapter member 14 may be constructed of a thermoplastic material, as for example tetrafluoroethylene known commercially by the trademark Teflon, or of metal with sealing flange 19 of a different resilient material suitably bonded to the adapter member.

It is believed now readily apparent that the present invention provides a self-sealing coupling for connecting an elongated cylindrical member to the wall of another member without causing axial movement of the cylindrical member as the connection is made.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:
1. A coupling for securing an elongated cylindrical member to another member having a tapped bore in the wall thereof comprising
 (a) a one piece adapter member having a threaded portion meshing with the tapped bore whereby said adapter member is secured against axial movement with respect to the wall, said adapter member having an annular deformable flange and a cup shaped portion,
 (b) an axial bore in said adapter member dimensioned to receive the cylindrical member therethrough,
 (c) said bore having a threaded counterbored section in the cup shaped portion,
 (d) a cap member having a head portion and a threaded shank portion receivable in the threaded counterbored section of the cup shaped portion of the adapter member,
 (e) an axial bore in said cap member having a diameter substantially equal to the diameter of the bore in the adapter member and dimensioned to receive the cylindrical member therethrough, and
 (f) said annular deformable flange being integral with and axially disposed in the adapter member in spaced relation to the threaded counterbored section to define an annular groove and having a tapered outer peripheral surface,
 (g) the bore of cap member being tapered inwardly from the end of the shank portion substantially complementary to the tapered peripheral surface of the flange so that the end of the shank portion fits in said annular groove and as the cap member is turned into the adapter member the shank portion of said cap member engages and forces the annular flange radially inwardly into fluid tight engagement with the surface of the cylindrical member so that substantially no axial thrust is transmitted to the cylindrical member.

2. The coupling of claim 1 wherein said cup shaped portion is enlarged over the dimension of the threaded portion to form a shoulder adapted to abut the wall when the threaded portion is turned into the tapped bore in the wall.

References Cited
UNITED STATES PATENTS

| | | | |
|---|---|---|---|
| 2,564,302 | 8/1951 | Fraser | 285—158 X |
| 2,755,110 | 7/1956 | Jacobs | 285—423 X |
| 2,788,992 | 4/1957 | Vienne et al. | 285—158 |
| 3,188,122 | 6/1965 | Smith | 285—423 |
| 3,233,920 | 2/1966 | Ammann | 285—423 |

EDWARD C. ALLEN, *Primary Examiner.*
THOMAS F. CALLAGHAN, *Examiner.*